(12) United States Patent
Hashimoto et al.

(10) Patent No.: US 11,267,454 B2
(45) Date of Patent: Mar. 8, 2022

(54) CONTROL SYSTEM FOR HYBRID VEHICLE

(71) Applicant: TOYOTA JIDOSHA KABUSHIKI KAISHA, Toyota (JP)

(72) Inventors: Toshiya Hashimoto, Miyoshi (JP); Naoto Kato, Susono (JP); Takashi Tsunooka, Gotemba (JP); Masatoshi Yoshinaga, Susono (JP); Hiroshi Watanabe, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 16/516,325

(22) Filed: Jul. 19, 2019

(65) Prior Publication Data
US 2020/0070810 A1 Mar. 5, 2020

(30) Foreign Application Priority Data
Aug. 29, 2018 (JP) .............................. JP2018-159997

(51) Int. Cl.
| | | |
|---|---|---|
| B60W 20/20 | (2016.01) | |
| B60L 58/15 | (2019.01) | |
| B60K 6/26 | (2007.10) | |
| B60K 6/28 | (2007.10) | |
| B60L 3/00 | (2019.01) | |
| B60K 6/442 | (2007.10) | |
| B60K 6/52 | (2007.10) | |

(52) U.S. Cl.
CPC .............. *B60W 20/20* (2013.01); *B60K 6/26* (2013.01); *B60K 6/28* (2013.01); *B60K 6/442* (2013.01); *B60L 3/0038* (2013.01); *B60L 58/15* (2019.02); *B60K 6/52* (2013.01); *B60L 2240/12* (2013.01); *B60L 2240/461* (2013.01); *B60W 2520/10* (2013.01); *B60W 2520/28* (2013.01); *B60Y 2200/92* (2013.01); *B60Y 2300/91* (2013.01)

(58) Field of Classification Search
None
See application file for complete search history.

(56) References Cited

U.S. PATENT DOCUMENTS

| | | | | |
|---|---|---|---|---|
| 7,906,863 | B2 * | 3/2011 | Yaguchi ................ | B60W 20/00 290/40 B |
| 8,947,025 | B2 * | 2/2015 | Hatsumi ................... | B60L 3/04 318/139 |
| 9,156,358 | B2 * | 10/2015 | Yu .......................... | B60T 8/1761 |
| 10,093,166 | B2 * | 10/2018 | Toyota .................. | B60W 10/08 |

FOREIGN PATENT DOCUMENTS

| | | |
|---|---|---|
| JP | 2010-215007 A | 9/2010 |
| JP | 2013-151247 | 8/2013 |

* cited by examiner

*Primary Examiner* — Todd Melton
(74) *Attorney, Agent, or Firm* — Sughrue Mion, PLLC

(57) ABSTRACT

A control system for a hybrid vehicle that can prevent an overcharging of a battery even if a wheel speed drops abruptly. The hybrid vehicle comprises: an engine; a generator that is driven by the engine; a drive motor that generate a drive torque; and a battery. The electric power generated by the generator is supplied directly to the battery or the drive motor. A controller is configured to determine whether the drive wheel will be locked, and to reduce the electric power generated by the generator less than an acceptable input power to the battery if the drive wheel is expected to be locked.

4 Claims, 6 Drawing Sheets

CONTROL SYSTEM FOR HYBRID VEHICLE

CROSS REFERENCE TO RELATED APPLICATIONS

The present application claims the benefit of priority to Japanese Patent Application No. 2018-159997 filed on Aug. 29, 2018 with the Japanese Patent Office, the entire contents of which are incorporated herein by reference in its entirety.

BACKGROUND

Field of the Disclosure

Embodiments of the present disclosure relate to the art of a control system for a hybrid vehicle in which a prime mover includes an engine and a motor-generator, and more specifically, to a control system for a hybrid vehicle in which a motor-generator is driven by an engine to generate electricity.

Discussion of the Related Art

JP-A-2013-151247 describes a control device for a hybrid vehicle comprising an engine, a generator, a drive motor, and a battery. The vehicle described in JP-A-2013-151247 is a so-called "series hybrid vehicle" in which the generator is driven by the engine, and electricity generated by the generator is accumulated in the battery and supplied to the drive motor. According to the teachings of JP-A-2013-151247, when charging and discharging of the battery is restricted due to e.g., a reduction in a temperature, the generator is driven to generate electricity. The electricity generated by the generator is consumed to achieve a required drive force without excess and deficiency. Such control is called the direct power distribution control.

If a traction control is executed in the event of slippage of wheels during execution of the direct power distribution control, generation of the generator would be variated due to response delay of the engine. Consequently, a target traction may not be achieved and an overcharging of the battery may be caused. In order to prevent such disadvantages, the control device taught by JP-A-2013-151247 is configured to set a parameter for controlling a time constant, and to use such parameter to control a servo system controlling a speed of a drive wheel. Specifically, the control device determines an occurrence of slippage of the wheel, and if a response delay of the engine is expected, the control device correct a torque command to the drive motor by an increased time constant so that the speed of the wheel is adjusted to a target speed in a mild manner.

Thus, the control device taught by JP-A-2013-151247 is configured to correct the torque command to the drive motor taking account of response delay of the engine when the wheel is slipped due to increase in a braking force during execution of the direct power distribution control. However, the control device taught by JP-A-2013-151247 is configured to improve traction of the wheel which starts slipping already. That is, when the slipping wheel grips a road surface again, a speed of the wheel drops abruptly. In this situation, a required generation amount by the generator may not be calculated accurately based on the current wheel speed. Specifically, the required generation amount by the generator is calculated based on a speed of the wheel higher than an actual speed and consequently an excessive amount of electric power with respect to an actual speed of the drive motor will be generated by the generator. The electricity thus generated excessively may not be consumed to operate the drive motor and surplus electricity may be accumulated in a battery. As a result, the battery may be overcharged. In addition, since the control device taught by JP-A-2013-151247 is configured to control the traction by increasing the time constant in accordance with the response delay of the engine, it will take longer time to adjust the actual wheel speed to the target speed.

SUMMARY

Aspects of the present disclosure have been conceived noting the foregoing technical problems, and it is therefore an object of the present disclosure to provide a control system for a hybrid vehicle that can prevent an overcharging of a battery even if a wheel speed drops abruptly.

The control system according to the exemplary embodiment of the present disclosure is applied to a hybrid vehicle comprising: an engine; a generator that is driven by the engine; a drive motor that is connected to drive wheels, and that is operated to generate a drive torque for propelling the hybrid vehicle by supplying the electric power to the drive motor; and an electric storage device that is charged with an electric power electricity generated by the generator. The control system is configured to supply the electric power generated by the generator directly to the electric storage device or the drive motor. The control system comprises a controller that controls the generator. In order to achieve the above-explained objective, according to the exemplary embodiment of the present disclosure, the controller is configured to: determine whether at least one of the drive wheels is expected to be locked; and reduce the electric power generated by the generator less than an acceptable input power to the electric storage device in a case that the drive wheel is expected to be locked.

In a non-limiting embodiment, the control system may further comprise an assist control system that controls a posture and a behavior of the hybrid vehicle. The controller may be further configured to determine that the at least one of the drive wheels is expected to be locked upon reception of a detection signal indicating abnormality from a sensor that detects the behavior of the hybrid vehicle.

In a non-limiting embodiment, the controller may be further configured to: determine whether the assist control system is not activated in a case that the drive wheel is not expected to be locked; and reduce the electric power generated by the generator less than an upper limit value calculated based on the acceptable input power to the electric storage device, and the electric power to be consumed by the drive motor at a speed of the hybrid vehicle, in a case that the assist control system is not activated.

In a non-limiting embodiment, controller may be further configured to reduce the electric power generated by the generator less than an upper limit value calculated based on the acceptable input power to the electric storage device, and the electric power to be consumed by the drive motor at a speed of the drive wheel, in a case that the assist control system is activated.

In a non-limiting embodiment, the hybrid vehicle may be a series hybrid vehicle in which the generator is driven by an output power of the engine to generate the electric power, and in which the electric power generated by the generator is supplied to the drive motor to generate the drive torque to be delivered to the drive wheels.

In a non-limiting embodiment, an operating mode of the hybrid vehicle may be selected from: a series hybrid vehicle mode in which the generator is driven by an output power of the engine to generate the electric power, and the drive motor is operated by the electric power generated by the generator to generate the drive torque to be delivered to the drive wheels to propel the hybrid vehicle; and a parallel hybrid vehicle mode in which the torques of the engine and the drive motor are delivered to the drive wheels to propel the hybrid vehicle. The controller may be further configured to: determine whether warm-up of the engine has been completed in a case that the at least one of the drive wheels is expected to be locked during propulsion in the series hybrid vehicle mode, and shift the operating mode from the series hybrid vehicle mode to the parallel hybrid vehicle mode in a case that the warm-up of the engine has been completed.

Thus, according to the exemplary embodiment of the present disclosure, the control system is configured to reduce the electric power generated by the generator less than the acceptable input power to the electric storage device in the case that the drive wheel is expected to be locked. According to the exemplary embodiment of the present disclosure, therefore, an overcharging of the electric storage device can be prevented even if the electricity generated by the generator cannot be consumed by the drive motor. For this reason, damage of the electric storage device can be limited.

In the case that the drive wheel is not expected to be locked but the assist control system is not activated, the control system reduces the electric power generated by the generator less than the upper limit value calculated based on the acceptable input power to the electric storage device, and the electric power to be consumed by the drive motor at a speed of the hybrid vehicle. Therefore, the electric power to be generated by the generator is restricted in such a manner that the drive motor can be operated by the electric power generated by the generator while charging the electric storage device by the remaining electric power within the current acceptable input power to the electric storage device. For this reason, an overcharging of the electric storage device can be prevented and a damage on the electric storage device can be limited also in this case.

In the case that the assist control system is activated, the control system restricts the electric power to be generated by the generator less than the upper limit as a total value of: the current acceptable input power to the electric storage device; and the electric power to be consumed by the drive motor at the current wheel speed. For this reason, an overcharging of the electric storage device may be prevented and a damage on the electric storage device may be limited also in this case.

In the case that the at least one of the drive wheels is expected to be locked in the vehicle in which the parallel hybrid vehicle mode is available, and the warm-up of the engine has already been completed, the control system shifts the operating mode from the series hybrid vehicle mode to the parallel hybrid vehicle mode. In the parallel hybrid mode, the generator will not generate electricity. In this case, therefore, an overcharging of the electric storage device may also be prevented.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure, and do not limit a scope of the present disclosure.

Figure 1:
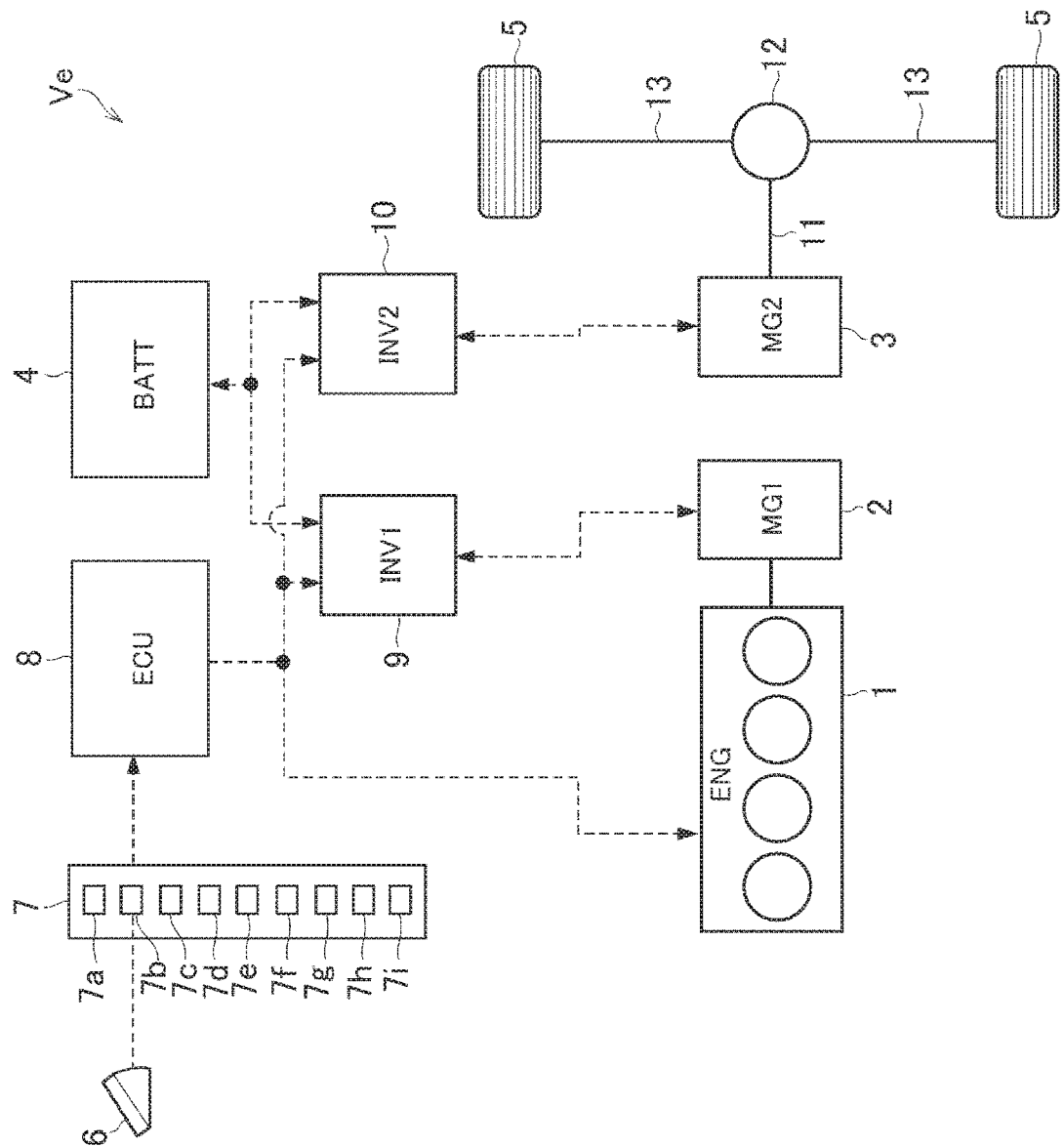
FIG. 1 is a schematic illustration showing one example of a drive system and a control system of a hybrid vehicle to which the control system according to the embodiment of the present disclosure is applied.

The control system according to the exemplary embodiment of the present disclosure is applied to a hybrid vehicle (as will be simply called the "vehicle" hereinafter) Ve comprising a generator (or a motor-generator) which is driven by an engine to generate electricity, and a drive motor to which the electricity generated by the generator is supplied to generate torque. The torque generated by the drive motor is delivered to drive wheels to propel the vehicle Ve. Referring now to FIG. 1, there is shown an example of a drive system and a control system of the vehicle Ve as a series hybrid vehicle. In the vehicle Ve illustrated in FIG. 1, a prime mover includes an engine (referred to as "ENG" in FIG. 1) 1, a first motor (referred to as "MG1" in FIG. 1) 2 and a second motor (referred to as "MG2" in FIG. 1) 3 as a drive motor. The vehicle Ve further comprises a battery (referred to as "BATT" in FIG. 1) 4, drive wheels 5, an accelerator pedal 6, a detector 7, and a controller (referred to as "ECU" in FIG. 1) 8.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The first motor 2 is disposed on the output side of the engine 1. The first motor 2 serves not only as a generator to generate electricity when driven by the torque of the engine 1, but also as a motor to crank the engine 1. Thus, the first motor 2 is a motor-generator. For example, a permanent magnet type synchronous motor, and an induction motor may be adopted as the first motor 2. The first motor 2 is connected to the battery 4 through a first inverter (referred to as "INV1" in FIG. 1) 9 so that the electricity generated by the first motor 2 can be accumulated in the battery 4.

Likewise, the second motor 3 serves not only as a motor to generate torque when driven by electricity supplied thereto, but also as a generator to generate electricity when driven by torque applied thereto from an external source. Thus, the second motor 3 is also a motor-generator. For example, a permanent magnet type synchronous motor, and an induction motor may also be adopted as the second motor 3. The second motor 3 is connected to the battery 4 through a second inverter (referred to as "INV2" in FIG. 1) 10 so that the second motor 3 is operated as a motor to generate torque by supplying electricity to the second motor 3 from the battery 4. The first motor 2 and the second motor 3 are connected to each other through the first inverter 9 and the second inverter 10 and hence the electricity can be exchanged therebetween. The second motor 3 may also be allowed to generate torque by directly supplying electricity generated by the first motor 2.

The battery 4 is a power storage device that stores electricity generated by the first motor 2 and the second motor 3, and is electrically connected to each of the first motor 2 and the second motor 3. The electricity generated by the first motor 2 may be accumulated in the battery 4, and the first motor 2 may be operated as a motor by supplying electricity to the first motor 2 from the battery 4. Similarly, the electricity generated by the second motor 3 may also be accumulated in the battery 4, and the second motor 3 may be operated as a motor by supplying electricity to the second motor 3 from the battery 4. For example, not only a secondary battery such as a lithium ion battery and a nickel-hydrogen battery, but also a capacitor or a condenser may be adopted as the battery 4.

In the vehicle Ve, the second motor 3 is connected to the drive wheels 5 as rear wheels through a propeller shaft 11, a differential gear unit 12, and a drive shaft 13 so that a drive torque generated by the second motor 3 is delivered to the drive wheels 5. Thus, the vehicle Ve shown in FIG. 1 is a rear-drive layout vehicle in which the drive torque is delivered to rear wheels (drive wheels 5) to generate a drive force. Nonetheless, the control system according to the exemplary embodiment may also be applied to a front-drive layout vehicle in which the drive torque is delivered to front wheels, and a four-wheel-drive vehicle in which the drive torque is delivered to each of the front and rear pairs of wheels.

The drive wheels 5 may be connected to the second motor 3 through a speed reducing mechanism (not shown). For example, a geared transmission, a continuously variable transmission and so on may be adopted as the speed reducing mechanism.

The accelerator pedal 6 is an operation device manipulated by a driver to control the drive force to propel the vehicle Ve. In the vehicle Ve, torques of the engine 1, the first motor 2, and the second motor 3 are controlled in accordance with an operation amount or a depression of the accelerator pedal 6. As described later, the accelerator pedal 6 is provided with an accelerator position sensor 7c for detecting the operation amount and an operation speed of the accelerator pedal 6. The accelerator position sensor 7c transmits detection data about the operation amount and the operation speed of the accelerator pedal 6 in the form of electric signal.

The controller 8 mainly controls the engine 1, the first motor 2, and the second motor 3. Specifically, the controller 8 is an electronic control unit configured having a microcomputer as its main component. The controller 8 receives various kinds of data detected or calculated by the detector 7. The controller 8 performs calculation using the incident data, and data and formulas and the like stored in advance. For example, the controller 8 receives data from: a vehicle speed sensor 7a that detects a speed of the vehicle Ve; a wheel speed sensor 7b that detects a speed of each wheel; the accelerator position sensor 7c that detects the operation amount and the operation speed of the accelerator pedal 6 operated by the driver; an engine speed sensor 7d that detects a rotational speed of the engine 1; a first motor speed sensor (or a resolver) 7e that detects a rotational angle or rotational speed of the first motor 2; a second motor sensor (or a resolver) 7f that detects a rotational angle or rotational speed of the second motor 3; an SOC sensor 7g that detects a state of charge (to be abbreviated as "SOC" hereinafter) level of the battery 4; a steering sensor 7h that detects a rotational angle of a steering wheel (not shown); and a behavior sensor 7i that detects a behavior of the vehicle Ve controlled by a control system such as an ABS and a TRC.

In addition, a map for determining an operating mode, a map for determining a required drive force and a required electric power and so on are installed in the controller 8. The controller 8 is configured to carry out a calculation based on the incident signals from the detector 7 and the data installed in advance such as the above-mentioned maps, and transmit a calculation result in the form of command signal. Optionally, a plurality of the ECUs may be arranged in the vehicle Ve according to need.

An operating mode of the vehicle Ve may be selected from a plurality of modes by manipulating the engine 1, the first motor 2, and the second motor 3 by the controller 8 with reference to a map for shifting the operating mode based on a required drive force and a vehicle speed. Specifically, the operating mode of the vehicle Ve may be selected from: an electric vehicle mode (to be abbreviated as the "EV mode" hereinafter) in which a drive force is generated by delivering the torque generated by the second motor 3 to the drive wheels 5 while stopping the engine 1; and a series hybrid vehicle mode (to be abbreviated as the "series HV mode" hereinafter) in which the engine 1 is operated to drive the first motor 2 as a generator by the torque of the engine 1 to generate electricity, and a drive force is generated by delivering the torque generated by the second motor 3 to the drive wheels 5.

Thus, in the vehicle Ve shown in FIG. 1, the first motor 2 is driven by the engine 1 to generate electricity, and the electricity generated by the first motor 2 is accumulated in the battery 4 or supplied to the second motor 3. A required (or target) electric power to be generated by the first motor 2 is calculated based on a speed of the drive wheel 5 and a depression of the accelerator pedal 6, and an output power of the engine 1 is controlled in such a manner as to operate the first motor 2 to achieve the required electric power. A required output power of the second motor 3 is also calculated based on a speed of the drive wheel 5 and a depression of the accelerator pedal 6, and a torque of the second motor 3 is controlled in such a manner as to achieve the required output power. However, if the speed of the drive wheel 5 is reduced abruptly by a disturbance, a power consumption of the second motor 3 will be reduced significantly, but the electric power generated by the first motor 2 will not be reduced promptly. In this situation, if an acceptable input power (Win) to the battery 4 is restricted for some reason, or if an SOC level of the battery 4 is significantly high, the battery 4 would be charged overly by the electricity generated by the first motor 2. In order to avoid such overcharging of the battery 4, the control system according to the exemplary embodiment of the present disclosure is configured to control a generation amount of the first motor 2 depending on the condition of the vehicle Ve.

Figure 2:
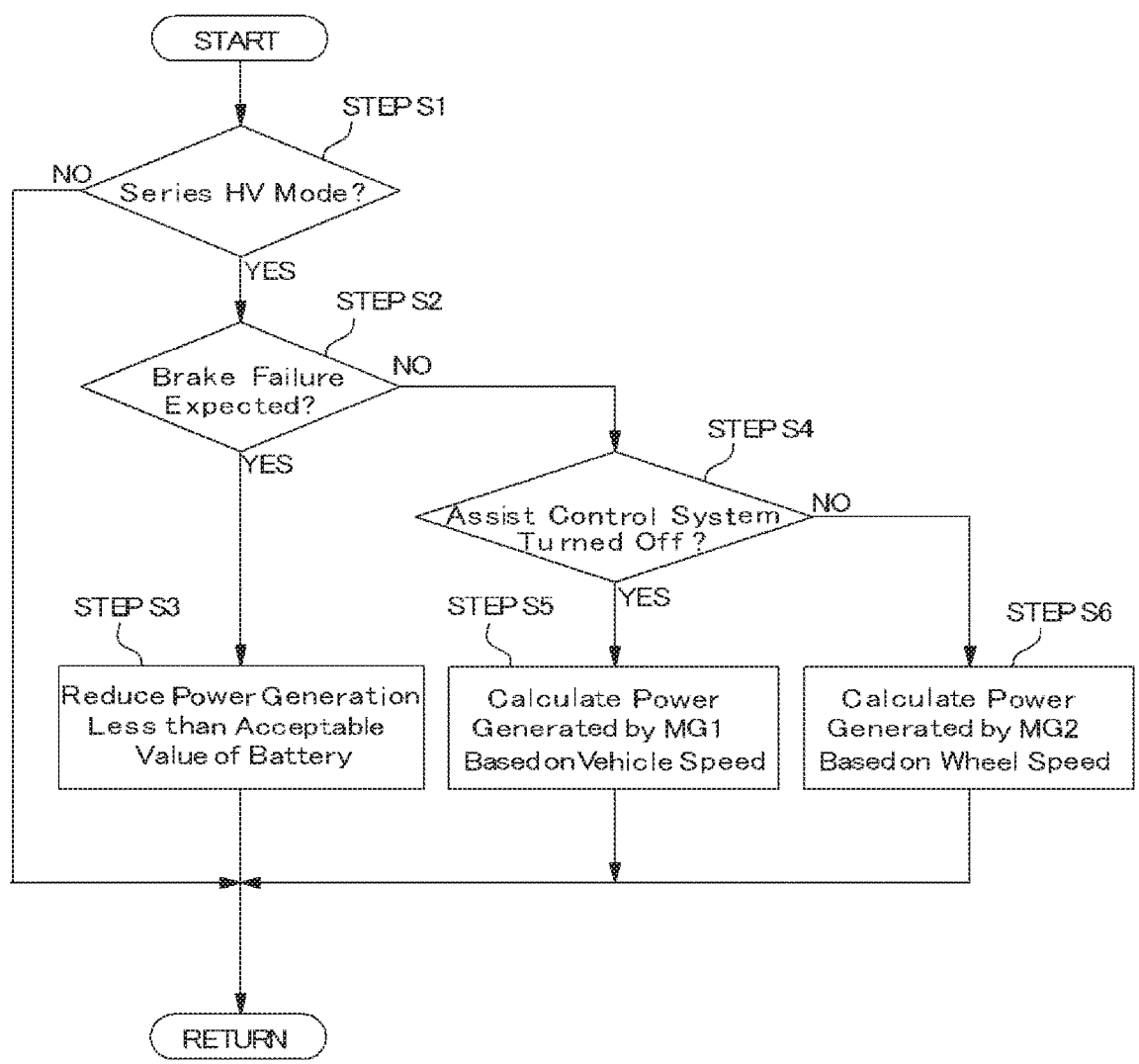
FIG. 2 is a flowchart showing one example of a routine executed by the control system according to the embodiment of the present disclosure.

Turing to FIG. 2, there is shown one example of a routine for controlling a generation amount of the first motor 2 depending on the condition of the vehicle Ve. At step S1, it is determined whether the series HV mode in which the first motor 2 is driven by the engine 1 to generate electricity is selected. If the EV mode is selected so that the answer of step S1 is NO, the routine returns.

By contrast, if the series HV mode is selected so that the answer of step S1 is YES, the routine progresses to step S2 to determine whether a failure of the brake is expected to occur. In other words, at step S2, it is determined whether at least one of the drive wheel 5 is expected to be locked due to the failure of the brake. The controller 8 determines that a failure of the brake is expected to occur when receiving a detection signal indicating abnormality from e.g., the vehicle speed sensor 7a, the wheel speed sensor 7b, the steering sensor 7h, or the behavior sensor 7i. Optionally, such abnormality may be indicated on an indicator.

If an occurrence of failure of the brake is expected so that the answer of step S2 is YES, the routine progresses to step S3 to reduce the required electric power to be generated by the first motor 2 less than the acceptable input power (Win) to the battery 4. Specifically, a current value of the acceptable input power (Win) to the battery 4 is calculated based on the current condition of the battery 4 including a temperature of the battery 4 and an SOC level of the battery 4. In this case, the electric power generated by the first motor 2 is reduced less than the current acceptable input power (Win) to the battery 4 thus calculated. For this reason, even when the drive wheel 5 is locked due to failure of the brake and hence the electric power generated by the first motor 2 cannot be consumed completely by the second motor 3, the battery 4 can be prevented from being charged excessively. As a result, an overcharging of the battery 4 can be prevented and a damage on the battery 4 can be limited.

Otherwise, if an occurrence of failure of the brake is not expected so that the answer of step S2 is NO, the routine progresses to step S4 to determine whether an assist control system for preventing wheel slippage is not activated. For example, the assist control system includes systems for controlling a posture and a behavior of the vehicle Ve such as an Anti-lock Brake System (ABS), a Traction Control System (TRC), a Vehicle Stability Control System (VSC), a Vehicle Dynamics Integrated Management System (VDIM) and so on. In this case, a possibility that the wheel 5 is locked is rather low, therefore, it is determined at step S4 whether an occurrence of slippage of the drive wheel 5 is expected. In the event of wheel slippage, an actual speed of the slipping wheel is increased higher than an actual speed of the vehicle. Therefore, if the assist control system is not activated so that the answer of step S4 is YES, the routine progresses to step S5 to calculate the required electric power to be generated by the first motor 2 based on the current vehicle speed.

In this case, the electric power to be generated by the first motor 2 is restricted less than an upper limit as a total value of: the above-mentioned current acceptable input power (Win) to the battery 4; and the electric power to be consumed by the second motor 3 at the current vehicle speed. In other words, the electric power to be generated by the first motor 2 is restricted in such a manner that the second motor 3 can be operated by the electric power generated by the first motor 2 while charging the battery 4 by the remaining electric power generated by the first motor 2 within the current acceptable input power (Win) to the battery 4. That is, power consumption by the second motor 3 and charging of the battery 4 is balanced. For this reason, an overcharging of the battery 4 may be prevented also in this case.

Figure 3:
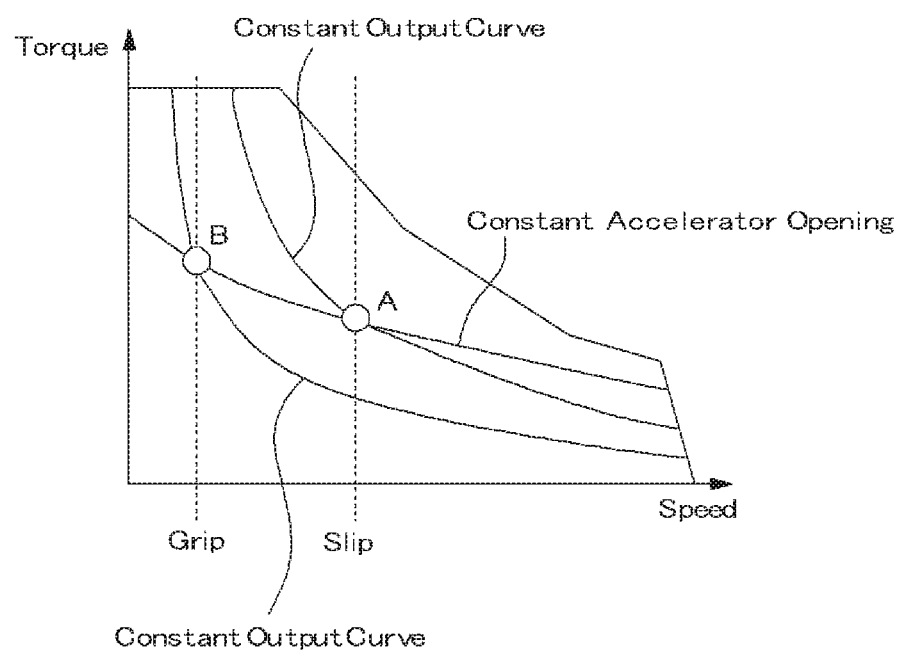
FIG. 3 is a map determining constant output curves based on a speed and a torque of the first motor.

Turing to FIG. 3, there is shown a difference in the electric power to be generated by the first motor 2 between a situation in which the drive wheel 5 slips and a situation in which the slipping driving wheel 5 grips a road surface again. FIG. 3 is a map determining constant output curves based on a speed and a torque of the first motor 2. In FIG. 3, the electric power generated by the first motor 2 when the drive wheel 5 slips is represented by "A", and the electric power generated by the first motor 2 when the slipping drive wheel 5 grips a road surface is represented by "B". As described, the electric power to be generated by the first motor 2 is calculated based on a speed of the drive wheel 5 and a depression of the accelerator pedal 6. Here, the depression of the accelerator pedal 6 is same in both cases shown in FIG. 3. As can be seen from FIG. 3, in the event of slippage of the drive wheel 5, a speed of the drive wheel 5 is increased so that a larger electric power is generated by the first motor 2 as indicated by "A". By contrast, when the slipping drive wheel 5 grips the road surface again, a speed of the drive wheel 5 is reduced abruptly and consequently the electric power generated by the first motor 2 is reduced as indicated by "B" (A>B). As also described, such slippage of the drive wheel 5 may be caused if the assist control system such as the ABS and TRC is not activated. In the event of slippage of the drive wheel 5, the electric power will be generated excessively by the first motor 2 due to increase in the speed of the drive wheel 5. Then, after the slipping drive wheel 5 grips the road surface again, the speed of the second motor 3 is reduced with a reduction in the speed of the drive wheel 5, and hence the electric power generated by the first motor 2 may not be consumed by the second motor 3. Consequently the battery 4 may be charged overly by the remaining electric power which has not been consumed by the second motor 3. In this case, however, the control system calculates the required electric power to be generated by the first motor 2 based on the current vehicle speed. For this reason, the first motor 2 is allowed to generate electric power properly to prevent such overcharging of the battery 4.

By contrast, if the assist control system is activated so that the answer of step S4 is NO, the routine progresses to step S6 to calculate the required electric power to be generated by the first motor 2 based on the current speed of the drive wheel 5. In this case, since the assist control system is activated, the behavior of the vehicle Ve is stabilized without causing a slippage of the drive wheel 5, the electric power to be generated by the first motor 2 is controlled based on the current speed of the drive wheel 5 which is substantially identical to the speed of the second motor 3. Specifically, the electric power to be generated by the first motor 2 is restricted less than an upper limit value as a total value of: the above-mentioned current acceptable input power (Win) to the battery 4; and the electric power to be consumed by the second motor 3 at the current speed of the wheel 5.

Thus, the control system according to the exemplary embodiment is configured to control the electric power to be generated by the first motor 2 in accordance with the current condition of the vehicle Ve. Specifically, in the case that the drive wheel 5 is expected to be locked due to failure of the brake, the electric power to be generated by the first motor 2 is reduced to be less than the current acceptable input power (Win) to the battery 4. According to the exemplary embodiment, therefore, an overcharging of the battery 4 can be prevented and a damage on the battery 4 can be limited.

By contrast, in the case that a failure of the brake is not expected but the assist control system for preventing the wheel slippage is not activated, the control system calculates the electric power to be generated by the first motor 2 based on the speed of the vehicle Ve. In other words, the electric power to be generated by the first motor 2 is restricted in such a manner that the second motor 3 can be operated by the electric power generated by the first motor 2 while charging the battery 4 by the remaining electric power generated by the first motor 2 within the current acceptable input power (Win) to the battery 4. For this reason, an overcharging of the battery 4 can be prevented and a damage on the battery 4 can be limited also in this case. Further, in the case that the assist control system for preventing the wheel slippage is activated, the control system calculates the electric power to be generated by the first motor 2 based on the speed of the drive wheel 5. In this case, specifically, the electric power to be generated by the first motor 2 is restricted less than the upper limit as a total value of: the current acceptable input power (Win) to the battery 4; and the electric power to be consumed by the second motor 3 at the current speed of the wheel 5. For this reason, an overcharging of the battery 4 may be prevented and a damage on the battery 4 may be limited also in this case.

The control system according to the exemplary embodiment may also be applied to a vehicle shown in FIG. 4 that can be propelled by output powers of the engine 1 and the second motor 3 in a parallel hybrid mode (to be abbreviated as the "parallel HV mode" hereinafter). In the vehicle Ve shown in FIG. 4, an output torque of the engine 1 is delivered to a pair of front wheels 14, and an output torque of the second motor 3 is delivered to a pair of rear wheels 5. In order to selectively transmit power between the first motor 2 connected to the engine 1 and the front wheels 14, a clutch 15 is disposed between the first motor 2 and the front wheels 14. In the vehicle Ve shown in FIG. 4, although the clutch 15 is arranged on an output side of the first motor 2, the clutch 15 may also be arranged in a transmission (not shown) disposed between the first motor 2 and the front wheels 14. Specifically, the engine 1 and the first motor 2 are disconnected from a powertrain by disengaging the clutch 15, and connected to the powertrain by engaging the clutch 15.

Figure 4:
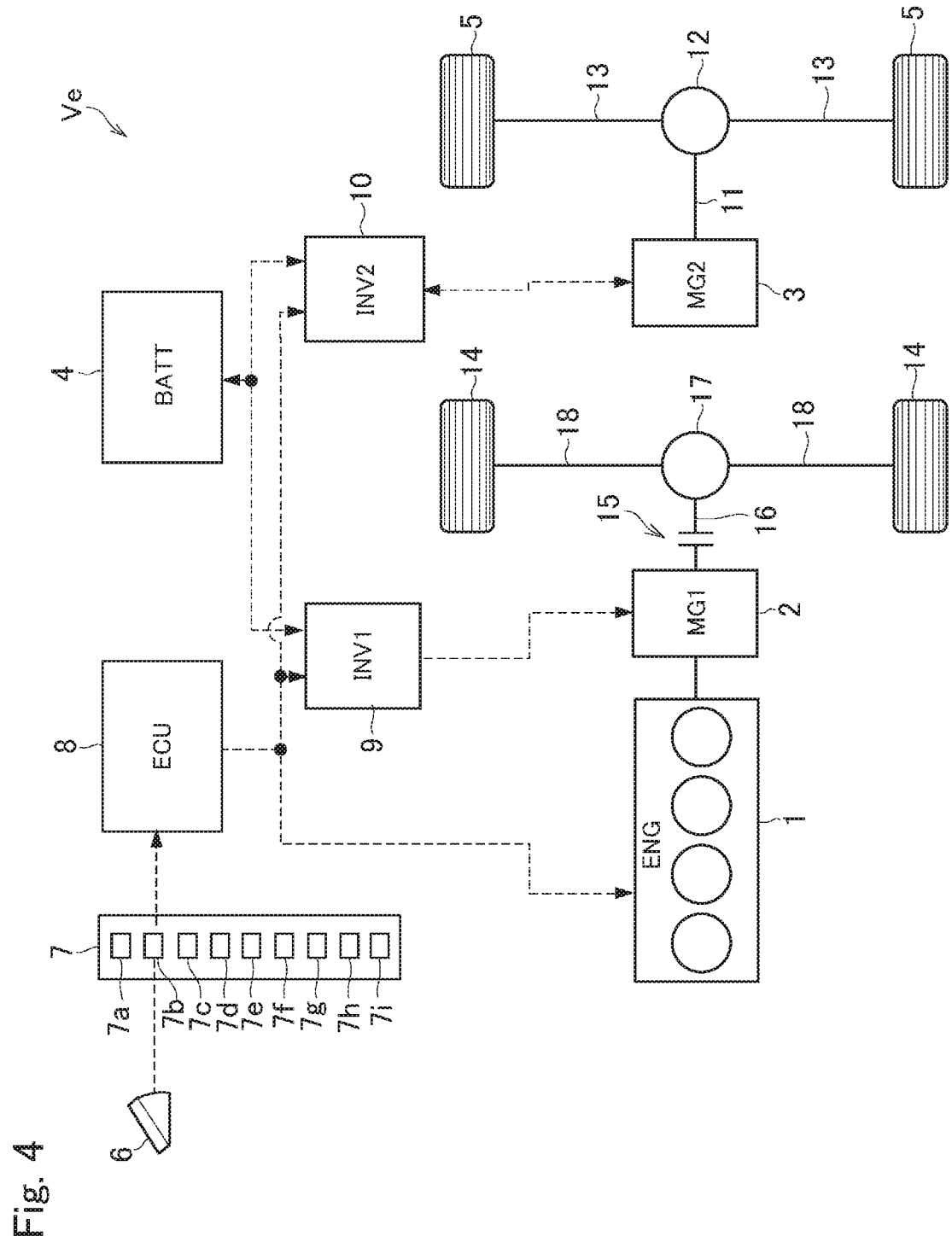
FIG. 4 is a schematic illustration showing another example of the drive system and the control system of the hybrid vehicle to which the control system according to the embodiment of the present disclosure is applied.

As illustrated in FIG. 4, the output torque of the engine 1 is delivered to the front wheels 14 via a front propeller shaft 16, a front differential gear unit 17, and a front driveshafts 18. The remaining elements are similar to those of the vehicle Ve shown in FIG. 1, and detailed explanation for those common elements will be omitted.

An operating mode of the vehicle Ve shown in FIG. 4 may be selected from a plurality of modes by manipulating the engine 1, the first motor 2, the second motor 3, and the clutch 15 by the controller 8 with reference to a map for shifting the operating mode based on a required drive force and a vehicle speed. Specifically, the operating mode of the vehicle Ve may be selected from: the EV mode in which a drive force is generated by delivering torque generated by the second motor 3 to the rear wheels 5 while stopping the engine 1; the series HV mode in which the engine 1 is operated while disengaging the clutch 15, the first motor 2 is operated as a generator by a torque of the engine 1 to generate electricity, and a drive force is generated by delivering torque generated by the second motor 3 to the drive wheels 5; and the parallel HV mode in which the engine 1 is operated while engaging the clutch 15, and a drive force is generated by delivering the torque of the engine 1 to the front wheels 14 while delivering the torque of the second motor 3 to the rear wheels 5.

Figure 5:
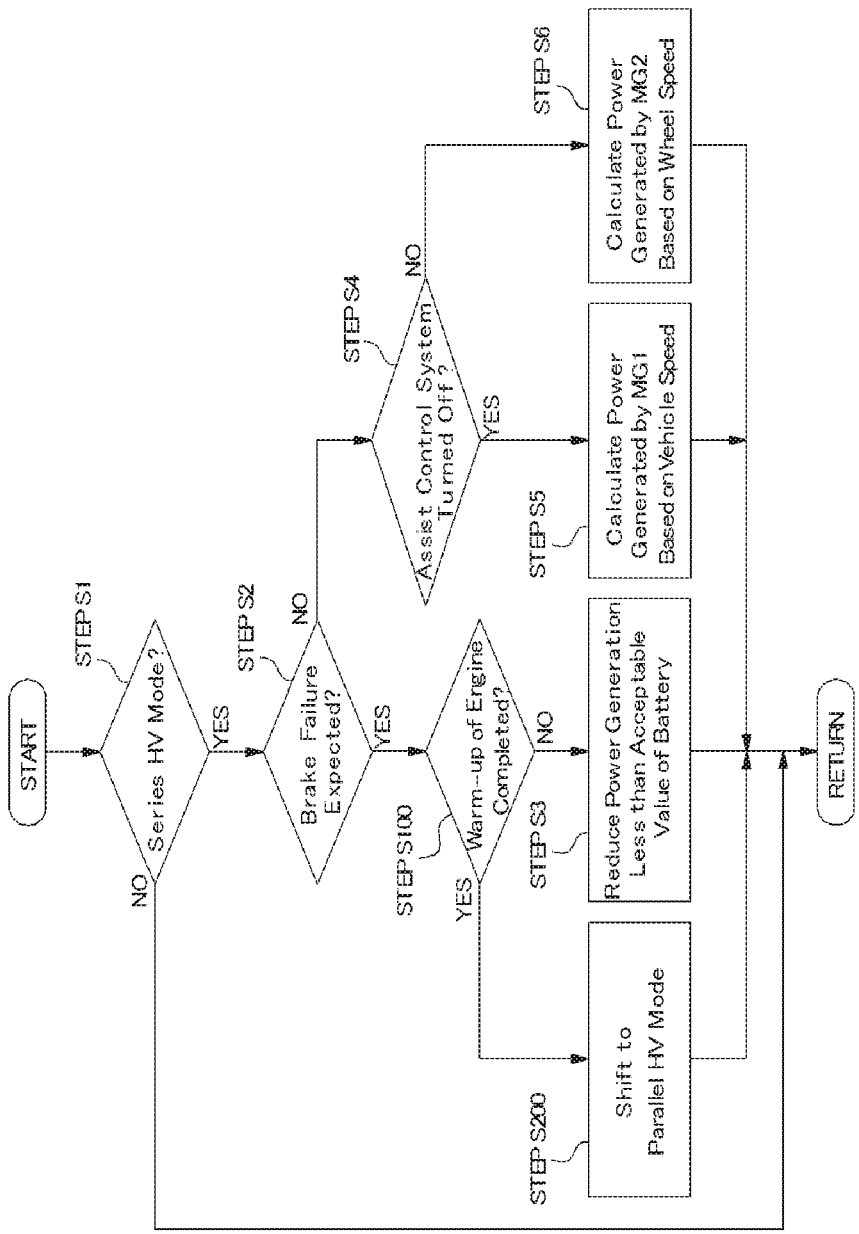
FIG. 5 is a flowchart showing another example of the routine executed by the control system according to the embodiment of the present disclosure.

Turing to FIG. 5, there is shown one example of a routine for controlling a generation amount of the first motor 2 depending on the condition of the vehicle Ve shown in FIG. 4. In the following description, explanations for the steps in common with those of the routine shown in FIG. 2 will be simplified or omitted.

At step S1, it is determined whether the series HV mode is selected. If the series HV mode is selected so that the answer of step S1 is YES, the routine progresses to step S2 to determine whether a failure of the brake is expected to occur. If the drive wheel 5 is expected to be locked due to failure of the brake so that the answer of step S2 is YES, the routine progresses to step S100 to determine whether a warm-up of the engine 1 and the transmission has been completed.

In other words, at step S100, it is determined whether the vehicle Ve can be powered by the engine 1 and the second motor 3 in the parallel HV mode. Specifically, an output power of the engine 1 during the warm-up is greater than an output torque of the engine 1 to driven the first motor 2 as a generator during propulsion in the series HV mode. Therefore, if the warm-up of e.g., the engine 1 has been completed so that the answer of step S100 is YES, the routine progresses to step S200 to shift the operating mode from the series HV mode to the parallel HV mode. Consequently, the torque of the engine 1 is delivered to the front wheels 14 and the torque of the second motor 3 is delivered to the rear wheels 5. That is, the vehicle Ve is propelled by the drive force generated by the engine 1 and the second motor 3 without generating electricity by the first motor 2.

By contrast, if the warm-up of the engine 1 and the transmission has not yet been completed so that the answer of step S100 is NO, the routine progresses to step S3 to reduce the required electric power to be generated by the first motor 2 less than the acceptable input power (Win) to the battery 4.

If an occurrence of failure of the brake is not expected so that the answer of step S2 is NO, the routine progresses to step S4 to determine whether the assist control system for preventing wheel slippage such as the ABS and the TRC is not activated. If the assist control system is not activated so that the answer of step S4 is YES, the routine progresses to step S5 to calculate the required electric power to be generated by the first motor 2 based on the current vehicle speed. By contrast, if the assist control system is activated so that the answer of step S4 is NO, the routine progresses to step S6 to calculate the required electric power to be generated by the first motor 2 based on the current wheel speed.

Thus, according to the example shown in FIG. 5, if the failure of the brake is expected and the warm-up of the engine 1 has been completed, the operating mode is shifted from the series HV mode to the parallel HV mode. Otherwise, if the failure of the brake is expected and the warm-up of the engine 1 has not yet been completed, the electric power generated by the first motor 2 is also reduced less than the current acceptable input power (Win) to the battery 4. According to the example shown in FIG. 5, therefore, an overcharging of the battery 4 may also be prevented and a damage on the battery 4 may also be limited.

Figure 6:
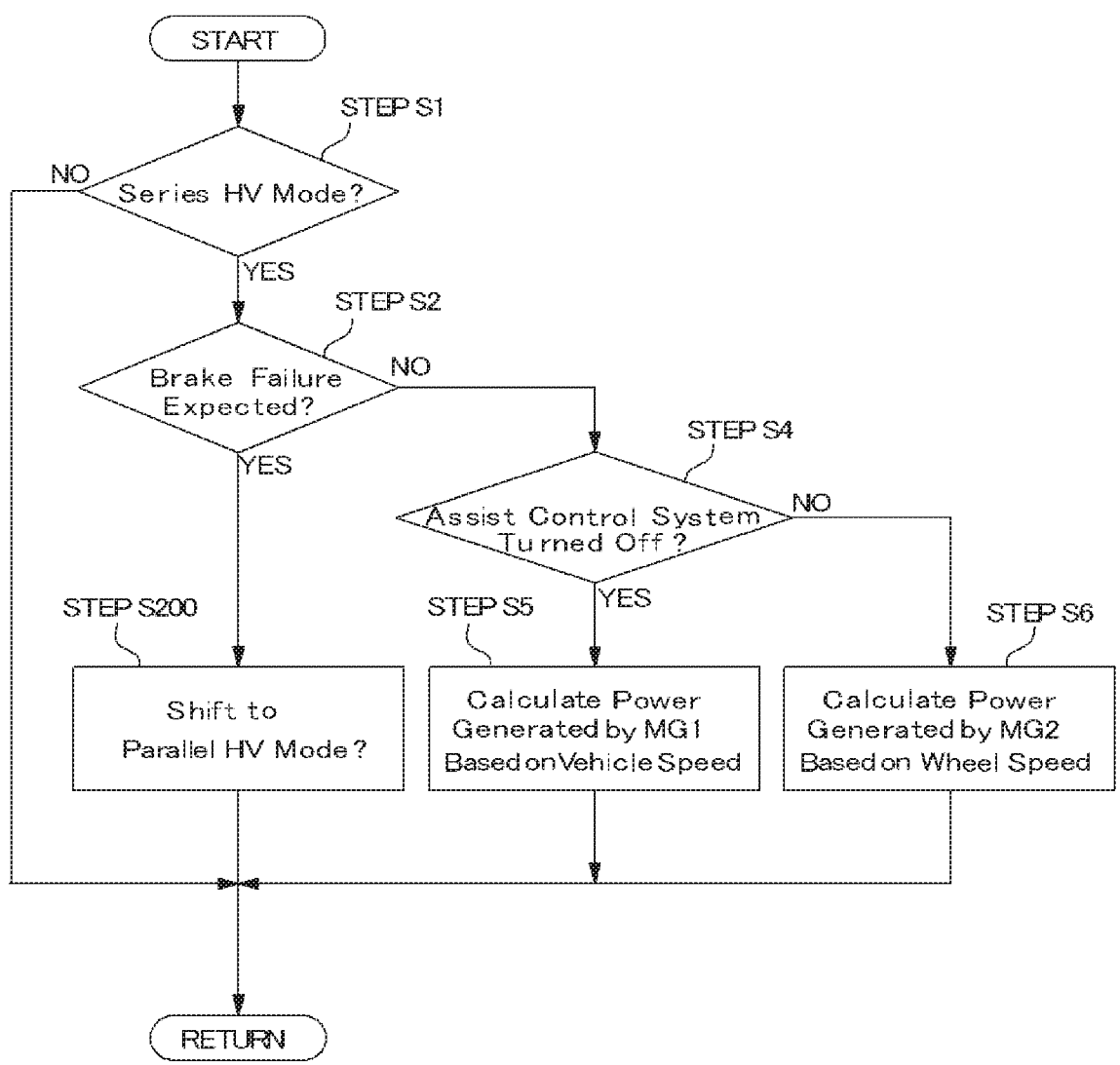
FIG. 6 is a flowchart showing a reference example of a routine possible to be executed by the control system according to the embodiment of the present disclosure.

Next, here will be explained a reference example of a routine possible to be executed by the control system according to the embodiment of the present disclosure with reference to FIG. 6. The routine shown in FIG. 6 is a modification of the routine shown in FIG. 5, and according to the routine shown in FIG. 6, the operating mode is shifted to the parallel HV mode if failure of the brake is expected to occur. In the following description, explanations for the steps in common with those of the foregoing routines will be simplified or omitted.

At step S1, it is determined whether the series HV mode is selected. If the series HV mode is selected so that the answer of step S1 is YES, the routine progresses to step S2 to determine whether a failure of the brake is expected to occur. If the drive wheel 5 is expected to be locked due to failure of the brake so that the answer of step S2 is YES, the routine progresses to step S200 to shift the operating mode from the series HV mode to the parallel HV mode. By contrast, if an occurrence of failure of the brake is not expected so that the answer of step S2 is NO, the routine progresses to step S4 to determine whether the assist control system for preventing wheel slippage such as the ABS and the TRC is not activated. If the assist control system is not activated so that the answer of step S4 is YES, the routine progresses to step S5 to calculate the required electric power to be generated by the first motor 2 based on the current vehicle speed. By contrast, if the assist control system is activated so that the answer of step S4 is NO, the routine progresses to step S6 to calculate the required electric power to be generated by the first motor 2 based on the current wheel speed. According to the reference example shown in FIG. 6, therefore, an overcharging of the battery 4 may also be prevented and a damage on the battery 4 may also be limited.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system according to the exemplary embodiment of the present disclosure may also avoid overcharging of the battery 4 when a speed of the drive motor drops due to some other reasons.

What is claimed is:

1. A control system for a hybrid vehicle, comprising:
an engine;
a generator that is driven by the engine;
a drive motor that is connected to drive wheels, and that is operated to generate a drive torque for propelling the hybrid vehicle by supplying an electric power to the drive motor;
an assist control system that controls a posture and a behavior of the hybrid vehicle;
an electric storage device that is charged with the electric power generated by the generator,
wherein the control system is configured to supply the electric power generated by the generator directly to the electric storage device or the drive motor,
the control system comprises a controller that controls the generator, and
the controller is configured to:
determine whether at least one of the drive wheels is expected to be locked upon reception of a detection signal indicating abnormality from a sensor that detects the behavior of the hybrid vehicle,
reduce the electric power generated by the generator less than an acceptable input power to the electric storage device in a case that the drive wheel is expected to be locked,
determine whether the assist control system is not activated in a case that the drive wheel is not expected to be locked, and
reduce the electric power generated by the generator to a value less than an upper limit value calculated based on the acceptable input power to the electric storage device, and the electric power to be consumed by the drive motor at a speed of the hybrid vehicle, in a case that the assist control system is not activated.

2. The control system for the hybrid vehicle as claimed in claim 1, wherein the controller is further configured to reduce the electric power generated by the generator to a value less than an upper limit value calculated based on the acceptable input power to the electric storage device, and the electric power to be consumed by the drive motor at a speed of the drive wheel, in a case that the assist control system is activated.

3. The control system for the hybrid vehicle as claimed in claim 1, wherein the hybrid vehicle includes a series hybrid vehicle in which the generator is driven by an output power of the engine to generate the electric power, and in which the electric power generated by the generator is supplied to the drive motor to generate the drive torque to be delivered to the drive wheels.

4. A control system for a hybrid vehicle, comprising:
an engine;
a generator that is driven by the engine;
a drive motor that is connected to drive wheels, and that is operated to generate a drive torque for propelling the hybrid vehicle by supplying an electric power to the drive motor; and
an electric storage device that is charged with the electric power generated by the generator,
wherein the control system is configured to supply the electric power generated by the generator directly to the electric storage device or the drive motor,
the control system comprises a controller that controls the generator, and
the controller is configured to:
determine whether at least one of the drive wheels is expected to be locked, and
reduce the electric power generated by the generator to less than an acceptable input power to the electric storage device in a case that the drive wheel is expected to be locked,
wherein an operating mode of the hybrid vehicle can be selected from:
a series hybrid vehicle mode in which the generator is driven by an output power of the engine to generate the electric power, and the drive motor is operated by the electric power generated by the generator to generate the drive torque to be delivered to the drive wheels to propel the hybrid vehicle; and
a parallel hybrid vehicle mode in which the torques of the engine and the drive motor are delivered to the drive wheels to propel the hybrid vehicle, and
the controller is further configured to:
determine whether warm-up of the engine has been completed in a case that the at least one of the drive wheels is expected to be locked during propulsion in the series hybrid vehicle mode, and
shift the operating mode from the series hybrid vehicle mode to the parallel hybrid vehicle mode in a case that the warm-up of the engine has been completed.

* * * * *